US012729316B2

(12) United States Patent
Gozu et al.

(10) Patent No.: US 12,729,316 B2
(45) Date of Patent: Sep. 8, 2026

(54) WATER-BASED INK JET INK COMPOSITION AND INK JET RECORDING METHOD

(71) Applicant: SEIKO EPSON CORPORATION, Tokyo (JP)

(72) Inventors: Sena Gozu, Shiojiri (JP); Yuko Hishida, Matsumoto (JP); Kenta Uchida, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 105 days.

(21) Appl. No.: 18/456,729

(22) Filed: Aug. 28, 2023

(65) Prior Publication Data

US 2024/0076512 A1 Mar. 7, 2024

(30) Foreign Application Priority Data

Aug. 29, 2022 (JP) ................................ 2022-135978

(51) Int. Cl.
*C09D 11/322* (2014.01)
*B41J 2/01* (2006.01)
(Continued)

(52) U.S. Cl.
CPC ............... *C09D 11/322* (2013.01); *B41J 2/01* (2013.01); *B41J 2/2107* (2013.01); *B41M 5/0023* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21;
(Continued)

(56) References Cited

U.S. PATENT DOCUMENTS

| | | | | |
|---|---|---|---|---|
| 2002/0040660 A1* | 4/2002 | Momose | C09D 11/322 | 106/31.86 |
| 2015/0022584 A1* | 1/2015 | Yamazaki | C09D 11/322 | 347/29 |

(Continued)

FOREIGN PATENT DOCUMENTS

| | | |
|---|---|---|
| CN | 113462231 A | 10/2021 |
| JP | 2010-195909 A | 9/2010 |

(Continued)

*Primary Examiner* — Manish S Shah
(74) *Attorney, Agent, or Firm* — Harness, Dickey & Pierce, P.L.C.

(57) ABSTRACT

A water-based ink jet ink composition contains C.I. Pigment Red 150 and at least one of 1-(2-hydroxyethyl)-2-pyrrolidone and ε-caprolactam.

9 Claims, 1 Drawing Sheet

(51) Int. Cl.

| | |
|---|---|
| ***B41J 2/21*** | (2006.01) |
| ***B41M 5/00*** | (2006.01) |
| ***C09D 11/38*** | (2014.01) |

(58) Field of Classification Search

CPC .. B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2016/0304734 | A1* | 10/2016 | Feng | B41J 11/0015 |
| 2017/0022383 | A1* | 1/2017 | Prasad | B41J 2/01 |
| 2017/0145238 | A1* | 5/2017 | Parazak | B41J 2/01 |
| 2017/0247558 | A1* | 8/2017 | Chen | C09D 11/322 |
| 2018/0016384 | A1* | 1/2018 | Chen | C09D 11/322 |
| 2018/0079921 | A1* | 3/2018 | Okamoto | C09D 11/322 |
| 2019/0177564 | A1* | 6/2019 | Rahimi | B41M 5/0017 |
| 2019/0185692 | A1* | 6/2019 | Jackson | C09D 11/322 |
| 2020/0131380 | A1* | 4/2020 | Zhou | C09D 11/322 |
| 2020/0131388 | A1* | 4/2020 | Guo | C09D 11/322 |
| 2020/0339829 | A1* | 10/2020 | Kumeta | C09D 11/322 |
| 2021/0238431 | A1 | 8/2021 | Yoda et al. | |
| 2021/0301155 | A1 | 9/2021 | Oki et al. | |
| 2021/0332254 | A1 | 10/2021 | Yamazaki et al. | |
| 2025/0340749 | A1 | 11/2025 | Ueda et al. | |

FOREIGN PATENT DOCUMENTS

| | | | |
|---|---|---|---|
| JP | 2012-184334 | A | 9/2012 |
| JP | 2019-210452 | A | 12/2019 |
| JP | 2021-172720 | A | 11/2021 |
| WO | 2018-088222 | A1 | 5/2018 |

* cited by examiner

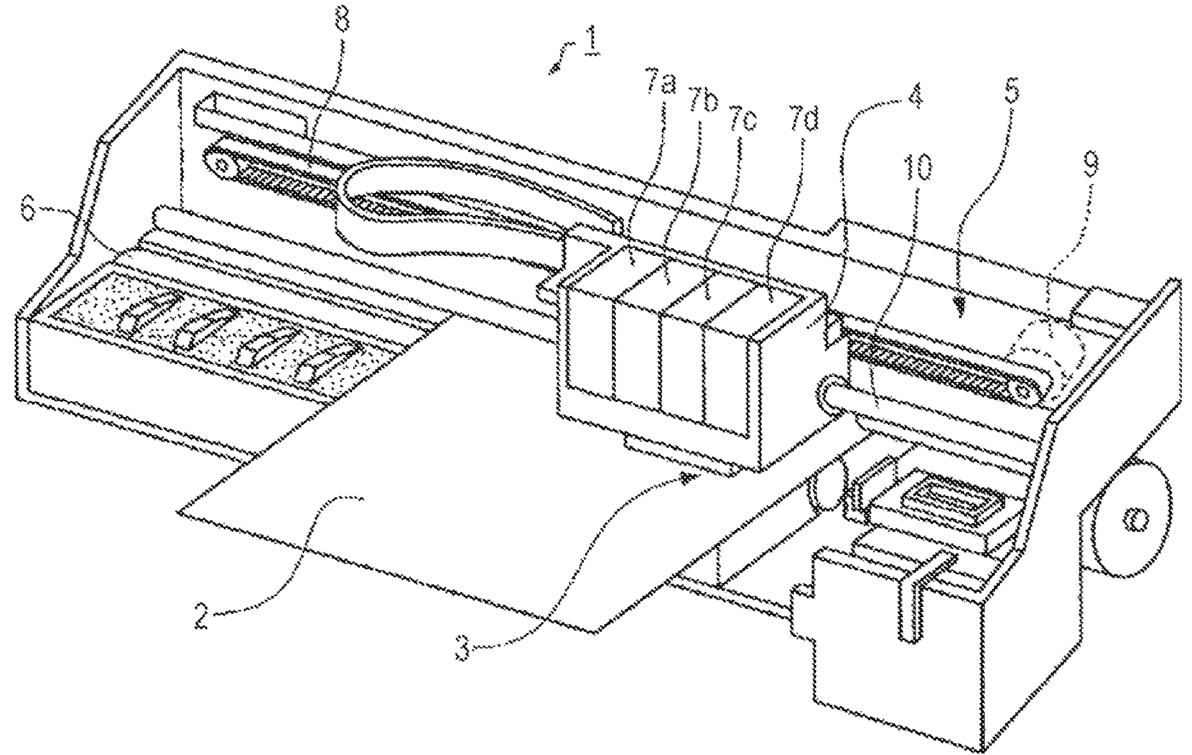
1
8
7a
7b
7c
7d
4
5
10
9
6
2
3

WATER-BASED INK JET INK COMPOSITION AND INK JET RECORDING METHOD

The present application is based on, and claims priority from JP Application Serial Number 2022-135978, filed Aug. 29, 2022, the disclosure of which is hereby incorporated by reference herein in its entirety.

BACKGROUND

1. Technical Field

The present disclosure relates to a water-based ink jet ink composition and an ink jet recording method.

2. Related Art

Ink jet recording methods have been rapidly developed in various fields since a high definition image can be recorded by using a relatively simple apparatus. In this regard, various types of research have been performed on an improvement in color reproducibility. For example, JP-A-2012-184334 discloses an aqueous ink jet ink that is an ink composition containing at least two types of azo pigments serving as coloring components, a pigment dispersion resin, water, and a water-soluble solvent, wherein the content of a compound serving as a constituent component of the two types of azo pigments and having a specific structural formula in an ink is 400 ppm or less and the water-soluble solvent is at least one selected from glycol ethers and diols to provide an ink jet ink having favorable dispersibility and storage stability, not causing nozzle plugging over time, having excellent print quality and color reproducibility, and satisfying other characteristics required of an ink jet ink in favorable balance.

When a red image is printed, printing with high red chroma is required for improving the visibility of red.

Research has been performed on enabling printing by using a magenta ink with higher red chroma to be performed, and when a high red chroma pigment is used, there is a problem that a dried ink is not readily redissolved with an ink composition being dried. Further, there is a tendency of, for example, plugging of an ink jet head to occur. Therefore, an ink jet ink composition having improved red chroma and having excellent redissolvability, recoverability from plugging, and the like has been desired.

SUMMARY

According to an aspect of the present disclosure, a water-based ink jet ink composition contains C.I. Pigment Red 150 and at least one of 1-(2-hydroxyethyl)-2-pyrrolidone and ε-caprolactam.

According to an aspect of the present disclosure, an ink jet recording method includes an ink attachment step of ejecting the above-described ink jet ink composition from an ink jet head so as to attach to a recording medium.

BRIEF DESCRIPTION OF THE DRAWING

FIGURE is a schematic perspective view illustrating an example of an ink jet recording apparatus.

DESCRIPTION OF EMBODIMENTS

The embodiment according to the present disclosure (hereafter referred to as "the present embodiment") will be described below in detail. However, the present disclosure is not limited to this and can be variously modified within the bounds of not departing from the scope of the disclosure.

1. Ink Jet Ink Composition

A water-based ink jet ink composition (hereafter also referred to simply as "ink composition") is a water-based ink jet ink composition containing C.I. Pigment Red 150 and at least one of 1-(2-hydroxyethyl)-2-pyrrolidone and ε-caprolactam.

When a red image is printed, printing with high red chroma is required for improving the visibility of red. For example, regarding a business ink jet printer (hereafter also referred to as "BIJ printer"), when an expression of confidentiality or the place for one's seal of a business document is printed, printing with high red chroma is required for improving the visibility of red. In addition, regarding special paper printing such as pop printing and poster printing, a printed material with high red chroma is desired.

In this regard, since most BIJ printers are of a desk top type and are not readily upsized in consideration of an installation place, to improve red chroma, the chroma of a magenta ink may be improved rather than a specific color ink such as a red ink is added. Consequently, printing by using magenta ink having higher red chroma may be enabled.

C.I. Pigment Red 150 (hereafter also referred to simply as "Pigment Red 150") is a water-insoluble azo-based pigment having high chroma. Using Pigment Red 150 as a pigment enables printing with high chroma to be performed without excessively increasing a pigment concentration in an ink jet ink composition.

On the other hand, regarding Pigment Red 150, plugging of an ink jet head tends to occur with an ink being dried, and recoverability from plugging tends to become poor. In addition, redissolvability of the ink is poor so that phase separation of the ink tends to be readily caused. There is no particular limitation regarding the cause of Pigment Red 150 having such characteristics, an example of the cause is conjectured that an impurity during synthesis of the pigment readily precipitates and crystallizes in the ink composition, and a precipitated and crystallized impurity is not readily redissolved.

In this regard, in the present embodiment, using at least one of 1-(2-hydroxyethyl)-2-pyrrolidone and ε-caprolactam in addition to Pigment Red 150 relaxes problems of Pigment Red 150 and enables recoverability from plugging, redissolvability, and the like to be improved. Consequently, Pigment Red 150 capable of improving red chroma can be used for an ink jet ink application.

The technical mechanism of an improvement in the recoverability from plugging and the redissolvability is not limited to the following, though it is conjectured that the cause is due to the above-described 1-(2-hydroxyethyl)-2-pyrrolidone or ε-caprolactam being capable of improving the compatibility between water and other components. In this regard, examples of the other components include components mainly having hydrophobicity. For example, organic solvents, surfactants, and impurities contained in Pigment Red 150 may be included. It is conjectured that 1-(2-hydroxyethyl)-2-pyrrolidone or ε-caprolactam enhancing compatibility between such components and water suppresses foreign matters from occurring, but the action mechanism is not limited to this.

An ink jet ink composition according to the present embodiment may be a magenta ink. In this regard, the magenta ink is an ink commonly used as an ink set with a cyan ink, yellow ink, and, as the situation demands, a black ink. There is no particular limitation regarding the magenta ink, and examples include inks generally named magenta ink in commercially available ink cartridges and inks assumed to be a magenta ink in general.

For example, the magenta ink according to the present embodiment may have a hue angle AH ° of from 330 to 360 when an image in which an ink composition is attached to a white IJ recording medium (for example, Photo Paper (Glossy) produced by Seiko Epson Corporation) in a minimum amount of attachment so that the ink composition is attached to the entire surface of the recording medium and the ground of the recording medium is not left is subjected to color measurement based on CIELAB color system in conformity with CIE by using an illuminant $D_{50}$ at a viewing angle of 2°. There is no particular limitation regarding a color measuring apparatus used for the above-described measurement, and examples include Spectrolino produced by GretagMacbeth.

The ink jet ink composition according to the present embodiment may also be used as an ink, other than the magenta ink, capable of recording a red color. Examples of the ink other than the magenta ink include a red ink. When the ink jet ink composition is used as a magenta ink among these, the ink jet ink composition may be used as a basic color ink used with a cyan ink, a yellow ink, and, as the situation demands, a black ink since an image having excellent red chroma can be recorded while the number of inks is minimized.

The ink composition according to the present embodiment may be used for an ink jet recording apparatus including an ink jet head and a supply passage for supplying the ink jet ink composition to the ink jet head, the supply passage having a portion in which a gas-liquid interface occurs. In this regard, the portion in which a gas-liquid interface occurs may be at least one selected from the group consisting of a filter, a valve, an ink tank, and an ink relay tank. Since the ink composition according to the present embodiment containing at least one of 1-(2-hydroxyethyl)-2-pyrrolidone and ε-caprolactam enables a gas-liquid interface foreign matter to be suppressed from occurring, the ink composition can be favorably used for such an ink jet recording apparatus. The ink jet recording apparatus will be described later in detail.

Each component of the ink composition according to the present embodiment will be described below in detail.

1.1 C.I. Pigment Red 150

C.I. Pigment Red 150 is a water-insoluble azo-based pigment having high red chroma. C.I. Pigment Red 150 has excellent chroma, but it is conjectured that precipitation and crystallization of an impurity tend to occur due to the impurity resulting from the impurity during synthesis of the pigment being dried in the ink composition.

The volume average particle diameter $D_{50}$ of Pigment Red 150 is preferably from 60 to 140 nm, more preferably from 80 to 120 nm, further preferably from 85 to 115 nm, and still further preferably from 90 to 110 nm. When the volume average particle diameter $D_{50}$ of Pigment Red 150 is less than or equal to the above-described upper limit value, the recoverability from plugging tends to become excellent, and when the volume average particle diameter $D_{50}$ is greater than or equal to the above-described lower limit value, the chroma tends to be further improved. In addition, when the volume average particle diameter $D_{50}$ is greater than or equal to the above-described lower limit value, the pigment dispersion strength is not excessively increased, and, therefore, impurities which occur with increasing pigment dispersion strength tend to be suppressed from increasing.

There is no particular limitation regarding a method for adjusting the volume average particle diameter $D_{50}$ of Pigment Red 150. For example, a pigment having a smaller volume average particle diameter $D_{50}$ tends to be obtained by performing pulverization treatment of the pigment, by increasing the time for pulverizing the pigment during pigment dispersion treatment, or the like. For example, specific contents will be described later in the example.

There is no particular limitation regarding a method for measuring the volume average particle diameter $D_{50}$ of the pigment, and examples include measurement by using a particle size distribution analyzer. There is no particular limitation regarding a measuring apparatus used for the measurement, and examples include MT3300EXII produced by Microtrac based on a laser diffraction scattering method.

The content of Pigment Red 150 is preferably from 0.5% to 10% by mass and more preferably from 2.0% to 8.0% by mass relative to the total amount of the ink jet ink composition. Further, the content is preferably from 3.0% to 7.0% by mass, more preferably from 4.0% to 7.0% by mass, further preferably from 5.0% to 7.0% by mass, and still further preferably from 5.5% to 6.5% by mass.

When the content of Pigment Red 150 is greater than or equal to the above-described lower limit value, the chroma tends to be further improved, and when the content of Pigment Red 150 is less than or equal to the above-described upper limit value, the recoverability from plugging tends to become excellent.

In this regard, the content of Pigment Red 150 is preferably 80% by mass or more, more preferably 90% by mass or more, further preferably 95% by mass or more, and may be 100% by mass relative to the total amount of a coloring material contained in the ink. In such an instance, the chroma can be further improved, and, favorably, the total content of the coloring material contained in the ink can be minimized.

1.2. 1-(2-Hydroxyethyl)-2-Pyrrolidone and ε-Caprolactam

In the present embodiment, C.I. Pigment Red 150 and at least one of 1-(2-hydroxyethyl)-2-pyrrolidone and ε-caprolactam being used in combination enables the impurity and the like in the dispersion liquid of Pigment Red 150 to be suppressed from precipitating and crystallizing while the chrome of Pigment Red 150 is maintained. Consequently, a gas-liquid interface foreign matter is favorably suppressed from occurring, and excellent recoverability from plugging, ejection stability, redissolvability, and the like tend to be realized.

The total content of at least one of 1-(2-hydroxyethyl)-2-pyrrolidone and ε-caprolactam is preferably from 0.5% to 15.0% by mass and more preferably from 1.0% to 10.0% by mass relative to the total amount of the ink jet ink composition. Further, the total content is preferably from 2.0% to 7.0% by mass, more preferably from 2.5% to 6.0% by mass, further preferably from 3.0% to 5.0% by mass, and still further preferably from 3.5% to 4.5% by mass. When the total content of at least one of 1-(2-hydroxyethyl)-2-pyrrolidone and ε-caprolactam is greater than or equal to the above-described lower limit value, a gas-liquid interface foreign matter is favorably suppressed from occurring, and excellent recoverability from plugging, ejection stability, redissolvability, and the like tend to be realized. In addition, when the total content is less than or equal to the above-described upper limit value, 1-(2-hydroxyethyl)-2-pyrrolidone and ε-caprolactam can be suppressed from precipitating, and the recoverability from plugging tends to become excellent.

The total content of at least one of 1-(2-hydroxyethyl)-2-pyrrolidone and ε-caprolactam is preferably from 0.1 to 3.0 parts by mass and more preferably from 0.2 to 2.8 parts by mass relative to 1.0 parts by mass of C.I. Pigment Red 150. Further, the total content is preferably from 0.3 to 2.5 parts by mass, more preferably from 0.4 to 2.0 parts by mass, further preferably from 0.5 to 1.5 parts by mass, and still further preferably from 0.6 to 1.0 parts by mass. In such an instance, a gas-liquid interface foreign matter is more favorably suppressed from occurring, and more excellent recoverability from plugging, ejection stability, redissolvability, and the like may be realized.

1.3. Organic Solvent

The ink composition according to the present embodiment may contain an organic solvent. There is no particular limitation regarding the organic solvent, and examples include monohydric alcohols, polyalcohols, and glycol ethers. Only one type of the organic solvents may be used, or two or more types thereof may be used in combination.

There is no particular limitation regarding the monohydric alcohol, and examples include methanol, ethanol, 1-propanol, isopropanol, 1-butanol, 2-butanol, isobutanol, and 2-methyl-2-propanol.

There is no particular limitation regarding the polyalcohol, and examples include ethylene glycol, diethylene glycol, triethylene glycol, tetraethylene glycol, pentaethylene glycol, propylene glycol, dipropylene glycol, tripropylene glycol, and glycerin.

There is no particular limitation regarding the glycol ether, and examples include triethylene glycol monomethyl ether, triethylene glycol dimethyl ether, triethylene glycol monobutyl ether, diethylene glycol monobutyl ether, and dipropylene glycol monopropyl ether.

The content of the organic solvent is preferably from 9.0% to 23% by mass, more preferably from 11% to 21% by mass, further preferably from 13% to 19% by mass, and still further preferably from 15% to 17% by mass relative to the total amount of the ink jet ink composition.

The organic solvent may contain an organic solvent having a normal boiling point of higher than 280° C. In particular, glycerin may be contained. The content of the organic solvent having a normal boiling point of higher than 280° C. is preferably 3% by mass or more, more preferably from 5% to 25% by mass, further preferably from 10% to 20% by mass, and particularly preferably from 12% to 17% by mass relative to the total amount of the ink jet ink composition. In such an instance, excellent recoverability from plugging, ejection stability, and the like may be realized.

1.4. Surfactant

The ink composition according to the present embodiment may contains a surfactant. There is no particular limitation regarding the surfactant, and examples include acetylene-based surfactants, silicone-based surfactants, and fluorine-based surfactants. Only one type of the surfactants may be used, or two or more types thereof may be used in combination.

When the ink composition contains a surfactant, phase separation of the surfactant may occur, and deterioration of ejection stability and the like may be caused. However, the ink composition according to the present embodiment containing at least one of 1-(2-hydroxyethyl)-2-pyrrolidone and ε-caprolactam enables dissolution of the surfactant in the ink composition to be facilitated and tends to enable phase separation to be suppressed from occurring.

There is no particular limitation regarding the acetylene-glycol-based surfactant, and examples include 2,4,7,9-tetramethyl-5-decyne-4,7-diol or 2,4,7,9-tetramethyl-5-decyne-4,7-diol alkylene oxide adducts and 2,4-dimethyl-5-decyne-4-ol or 2,4-dimethyl-5-decyne-4-ol alkylene oxide adducts.

There is no particular limitation regarding the silicone-based surfactant, and examples include polysiloxane-based compounds and polyether-modified organosiloxanes.

There is no particular limitation regarding the fluorine-based surfactant, and examples include perfluoroalkylsulfonates, perfluoroalkylcarboxylates, perfluoroalkylphosphoric acid esters, perfluoroalkyl ethylene oxide adducts, perfluoroalkylbetaines, and perfluoroalkylamine oxide compounds.

The content of the surfactant is preferably from 0.1% to 7.0% by mass relative to the total amount of the ink jet ink composition. Further, the content is preferably from 0.2% to 6.0% by mass, more preferably from 0.3% to 5.0% by mass, further preferably from 0.5% to 4.5% by mass, and still further preferably from 1.0% to 4.0% by mass.

1.5. Resin

The ink jet ink according to the present embodiment may contain a resin. The resin may be a water-soluble resin and may be used in the form of a resin emulsion. There is no particular limitation regarding the resin, and examples include urethane-based resins and (meth)acrylic resins. Only one type of the resins may be used, or two or more types thereof may be used in combination.

There is no particular limitation regarding the urethane-based resin provided that the resin has a urethane bond in the molecular structure, and examples of the urethane-based resin include polyether-type urethane resins having an ether bond in the main chain, polyester-type urethane resins having an ester bond in the main chain, and polycarbonate-type urethane resins having a carbonate bond in the main chain.

There is no particular limitation regarding the (meth)acrylic resin, and examples include polymers of (meth)acrylic monomers, such as (meth)acrylic acids and (meth)acrylic acid esters, and copolymers, such as styrene acrylic resins, of (meth)acrylic monomer and other monomers.

The content of the resin is preferably from 0.05% to 3.0% by mass, more preferably from 0.1% to 2.0% by mass, further preferably from 0.2% to 1.5% by mass, and still further preferably from 0.3% to 1.0% by mass relative to the total amount of the ink jet ink composition.

1.6. Alkali

The ink composition according to the present embodiment may contain an alkali. There is no particular limitation regarding the alkali, and examples include organic bases and inorganic bases. There is no particular limitation regarding the organic base, and examples include triethanolamine, diethanolamine, monoethanolamine, and tripropanolamine. There is no particular limitation regarding the inorganic base, and examples include lithium hydroxide, sodium hydroxide, and potassium hydroxide.

The content of the alkali is preferably from 0.1% to 3.0% by mass, more preferably from 0.2% to 2.0% by mass, further preferably from 0.4% to 1.5% by mass, and still further preferably from 0.6% to 1.0% by mass relative to the total amount of the ink jet ink composition.

1.7. Water

The water contained in the ink composition according to the present embodiment may be water from which ionic impurities are removed as much as possible. There is no particular limitation regarding such water, and examples include ion-exchanged water, ultrafiltered water, reverse osmosis water, and distilled water. Of these, ion-exchanged water may be used. The ink jet ink composition according to the present embodiment is a water-based ink. The water-based ink is an ink in which a main solvent component contained in the ink includes at least water.

The content of the water is preferably from 45% by mass or more and more preferably from 50% to 95% by mass relative to the total amount of the ink composition. Further, the content is preferably from 55% to 80% by mass, more preferably from 60% to 75% by mass, further preferably from 62.5% to 72.5% by mass, and still further preferably from 65% to 70% by mass.

1.8. Other Components

The ink composition according to the present embodiment may contain known components usable for ink compositions in the related art in addition to the above-described components. There is no particular limitation regarding such a known component, and examples include dissolution promoters, viscosity adjusters, pH adjusters, antioxidants, preservatives, fungicides, corrosion inhibitors, and chelating agents for capturing a predetermined metal ion having an influence on dispersion or other additives and organic solvents other than the above. Only one type of the other components may be used, or two or more types thereof may be used in combination.

2. Ink Jet Recording Method

The ink jet recording method according to the present embodiment includes an ejection step of ejecting the above-described ink jet ink composition from an ink jet head so as to attach to a recording medium and may include other steps, as the situation demands.

In the ejection step, an ink is ejected from the ink jet head and attached to a recording medium. More specifically, a pressure generation device disposed in a ink jet head is operated so as to eject the ink from a nozzle, the ink being introduced into a pressure generation chamber in the inkjet head. Such an ejection method is also referred to as an ink jet method.

Regarding the ink jet head used in the ejection step, there are a line head for performing recording based on a line system and a serial head for performing recording based on a serial system, and either head can be used.

In the line system using a line head, for example, an ink jet head having a width larger than or equal to a width of a recording medium is fixed to a recording apparatus. Subsequently, the recording medium is moved in a sub-scanning direction (transport direction of the recording medium), and an ink droplet is ejected from a nozzle of the ink jet head operatively associated with the movement so that an image is recorded on the recording medium.

In the serial system using a serial head, for example, an ink jet head is mounted on a carriage movable in a width direction of the recording medium. Subsequently, the carriage is moved in a main scanning direction (width direction of the recording medium), and an ink droplet is ejected from a nozzle of the ink jet head operatively associated with the movement so that an image is recorded on the recording medium.

The ink jet recording method according to the present embodiment may include a transport step. In the transport step, the recording medium is transported in the predetermined direction in a recording apparatus. More specifically, the recording medium is transported from a paper supply portion to a paper discharge portion of the recording apparatus by using a transport roller and a transport belt disposed in the recording apparatus. In the transport process, the ink ejected from the ink jet head is attached to the recording medium so that a recorded material is formed. Transportation may be continuously performed or intermittently performed. In this regard, the ejection step and the transport step may be simultaneously performed or alternately performed.

3. Ink Jet Recording Apparatus

There is no particular limitation regarding the ink jet recording apparatus according to the present embodiment provided that the recording apparatus includes at least an ink jet head and a supply passage for supplying the ink jet ink composition to the ink jet head and can form an image on a recording medium by ejecting the ink composition from the ink jet head. There is no particular limitation regarding a portion constituting the supply passage, and the supply passage includes an ink storage member and other portions.

FIGURE is a schematic perspective view illustrating an example of an ink jet recording apparatus usable for the present embodiment. A printer 1 serving as the ink jet recording apparatus includes an ink jet head 3, a carriage 4 which is incorporated with the ink jet head 3 and to which ink tanks 7*a* to 7*d* serving as ink storage members are detachably attached, a main scanning mechanism 5 for reciprocating the carriage 4 in the medium width direction, and a platen roller 6 for transporting a recording medium 2 to a platen located in the recording medium feed direction. In addition, printer 1 includes a control portion (not illustrated in the drawing) for controlling the action of the entire printer 1. In this regard, the medium width direction is the main scanning direction (head scanning direction), and the medium feed direction is the sub-scanning direction (direction orthogonal to the main scanning direction).

The main scanning mechanism 5 includes a timing belt 8 coupled to the carriage 4, a motor 9 for driving the timing belt 8, and a guide shaft 10 serving as a support member spanned in the main scanning direction. The carriage 4 is driven by the motor 9 through the timing belt 8 so as to reciprocate along the guide shaft 10 in the main scanning direction.

In the example illustrated in FIGURE, the ink tanks 7*a* to 7*d* are composed of four independent ink tanks. The ink tanks 7*a* to 7*d* store ink jet ink compositions containing, for example, black, magenta, cyan, and yellow pigments, respectively. In the example illustrated in FIGURE, the number of the ink tanks is four. However, the number is not limited to this, and a predetermined number of ink tanks can be mounted. The inks are supplied to the ink jet head 3 from outlet portions (not illustrated in the drawing) which are located in the bottom portion of the ink tanks 7$a$ to 7$d$ and which output the inks in the ink tanks.

The ink jet head 3 includes a passage (not illustrated in the drawing) for sending the supplied ink jet ink composition into the ink jet head and a nozzle (not illustrated in the drawing) which is coupled to the flow passage and which ejects the ink. The outlet portion of the ink tank is coupled to the ink jet head through, for example, an ink supply passage, and the ink composition is supplied from the ink tank to the ink jet head. In FIGURE, the ink tank is arranged on the carriage. However, arrangement is not limited to this, and an arrangement place may be other than the carriage. In such an instance, the outlet portion of the ink tank is coupled to the ink jet head through the ink supply passage. It is sufficient that the ink supply passage couples between two components, an ink can pass through the ink supply passage, and the ink is thereby supplied from one component to the other component. The ink supply passage is, for example, an ink tube.

There is no particular limitation regarding the ink storage member, and examples include ink tanks and ink relay tanks.

The ink tank is a component capable of being directly or indirectly coupled to the ink jet head through the ink supply passage, no ink storage member serving as a component capable of being coupled to the ink tank is included, and the ink stored in the ink tank is supplied to the ink jet head.

Examples of the ink tank include ink cartridges and CISS tanks.

The ink cartridge is a component capable of being detachably attached to the ink jet recording apparatus and may be, for example, an ink pack.

The CISS tank has an ink inlet, and an ink is supplied from an external ink container not coupled to the CISS tank through an ink supply passage to the CISS tank through the ink inlet.

The ink relay tank is a component capable of being directly or indirectly coupled to the ink jet head through the ink supply passage, an ink storage member is coupled upstream of the ink relay tank through an ink supply passage, an ink is supplied from the coupled ink storage member to the ink relay tank, and the ink is supplied from the ink relay tank to the ink jet head.

In the interior of the ink storage member, a gas-liquid interface tends to occur since an ink layer and an air layer may be included or bubbles may occur and build up.

There is no particular limitation regarding the other portions, and examples include ink supply passages, filters, and valves. There is no particular limitation regarding the filter and/or the valve, and it is sufficient that the filter and/or the valve is arranged between the ink storage member and the ink jet head, in the ink storage member, at the ink jet head, or the like. The filter and/or the valve may be arranged in the ink supply passage.

When the filter and/or the valve is arranged at the ink jet head, the filter and/or the valve may be included in an inlet portion through which the ink composition is supplied to the ink jet head or in the ink jet head. Regarding the filter and the valve, a gas-liquid interface tends to occur due to bubbles building up.

In the ink jet recording apparatus according to the present embodiment, the supply passage may have a portion in which a gas-liquid interface occurs. In this regard, The portion in which a gas-liquid interface occurs may be at least one selected from the group consisting of a filter, a valve, and an ink storage member. Since the ink composition according to the present embodiment excels at, for example, suppressing a gas-liquid interface foreign matter from occurring, the above-described ink jet recording apparatus is suitably used.

Regarding the ink jet recording apparatus according to the present embodiment, either a serial type or a line type can be used. These types of ink jet recording apparatuses are incorporated with an ink jet head, a predetermined image can be formed by ejecting a droplet of an ink composition from a nozzle hole of the ink jet head at a predetermined timing (intermittently) and in a predetermined volume (mass) while the relative positional relationship between the recording medium and the ink jet head is changed so as to attach the ink composition to the recording medium.

Herein, in general, regarding a serial-type ink jet recording apparatus, the transport direction of the recording medium intersects the direction of the reciprocating action of the ink jet head, and the relative positional relationship between the recording medium and the ink jet head is changed due to combination of the reciprocating action of the ink jet head and the transport action (including a reciprocating action) of the recording medium. In such an instance, in general, a plurality of nozzle holes (holes for ejecting the ink composition) are arranged in the ink jet head, and a line of nozzle holes (nozzle line) is formed in the transport direction of the recording medium. In this regard, a plurality of nozzle lines may be formed in the ink jet head in accordance with the type and the number of the ink composition.

In general, regarding a line-type ink jet recording apparatus, the ink jet head does not perform a reciprocating action, and the relative positional relationship between the recording medium and the ink jet head is changed due to the recording medium being transported. In such an instance, in general, a plurality of nozzle holes are arranged in the ink jet head, and a line of nozzle holes (nozzle line) is formed in the direction intersecting the transport direction of the recording medium.

The ink jet recording system of the ink jet recording apparatus uses the above-described serial-type or line-type ink jet recording apparatus, and there is no particular limitation regarding the system provided that the system can eject an ink composition in the form of a droplet from a fine nozzle hole so as to attach the droplet to the recording medium. Examples of the ink jet recording system include an electrostatic attraction system, a system in which an ink droplet is ejected due to a pump pressure, a system in which a piezoelectric element is used, and a system in which an ink droplet is ejected by heat foaming an ink liquid with a microelectrode.

There is no particular limitation regarding the ink jet recording apparatus used in the present embodiment, and known configurations, such as heating units, drying units, roll units, and take-up apparatuses, can be adopted without limitation.

4. Recording Medium

There is no particular limitation regarding the recording medium used in the present embodiment, and examples include absorbent recording media, low-absorbent recording media, and nonabsorbent recording media.

There is no particular limitation regarding the absorbent recording medium, and examples include normal paper having high ink permeability, such as electrographic paper, and ink jet paper (ink jet exclusive paper including an ink absorption layer composed of silica particles or alumina particles or an ink absorption layer composed of a hydrophilic polymer, such as a polyvinyl alcohol (PVA) or a polyvinylpyrrolidone (PVP)).

Examples of the low-absorbent recording medium include art paper, coated paper, and cast paper which have relatively low ink permeability and which are used for general offset printing.

There is no particular limitation regarding the nonabsorbent recording medium, and examples include plastic films and plates formed of polyvinylchlorides, polyethylenes, polypropylenes, polyethylene terephthalates (PETs), polycarbonates, polystyrenes, polyurethanes, and the like; metal plates formed of iron, silver, copper, aluminum, and the like; metal plates or plastic films and alloy plates such as stainless steel and brass, produced by vapor-depositing these various types of metals; and recording media in which a plastic film of a polyvinylchloride, a polyethylene, a polypropylene, a polyethylene terephthalate (PET), a polycarbonate, a polystyrene, a polyurethane, or the like is bonded (coating) to paper base materials.

Of these, absorbent recording media may be used from the viewpoint of being frequently used for desktop printers.

Examples

The present disclosure will be more specifically described below with reference to the examples and the comparative examples. The present disclosure is not limited to the following examples.

1. Preparation of Ink Jet Ink Composition

The components constituting the compositions presented in Table 1 and Table 2 were placed in a mixture tank, mixing agitation was performed, and filtration with a membrane filter was performed so as to obtain ink jet ink compositions of the examples and the comparative examples. In this regard, the numerical value of each component of each example presented in the table indicates % by mass, unless otherwise specified. The contents (% by mass) of the pigment and the resin presented in Table 1 and Table 2 indicate solids concentrations.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Ink composition | Pigment | P.R.150 | 6.00 | 6.00 | 6.00 | 6.00 | 6.00 | 6.00 | 6.00 | 2.00 | 3.00 | 8.00 |
| | | P.V.19 | | | | | | | | | | |
| | | P.R.122 | | | | | | | | | | |
| | Lactam compound | HEP | 4.00 | | 2.00 | 1.00 | 2.00 | 8.00 | 7.00 | 4.00 | 4.00 | 4.00 |
| | | ε-CPL | | 4.00 | 2.00 | | | | | | | |
| | | 2-Pyrrolidone | | | | | | | | | | |
| | Organic solvent | Gly | 8.00 | 8.00 | 8.00 | 8.00 | 8.00 | 8.00 | 8.00 | 8.00 | 8.00 | 8.00 |
| | | TEG | 5.00 | 5.00 | 5.00 | 5.00 | 5.00 | 5.00 | 5.00 | 5.00 | 5.00 | 5.00 |
| | | TEGmBE | 3.00 | 3.00 | 3.00 | 3.00 | 3.00 | 3.00 | 3.00 | 3.00 | 3.00 | 3.00 |
| | Surfactant | OLFIN E1010 | 2.00 | 2.00 | 2.00 | 2.00 | 2.00 | 2.00 | 2.00 | 2.00 | 2.00 | 2.00 |
| | | Surfynol 104 | 2.00 | 2.00 | 2.00 | 2.00 | 2.00 | 2.00 | 2.00 | 2.00 | 2.00 | 2.00 |
| | Resin | SUPERFLEX 420 | 0.50 | 0.50 | 0.50 | 0.50 | 0.50 | 0.50 | 0.50 | 0.50 | 0.50 | 0.50 |
| | Alkali | TEA | 0.80 | 0.80 | 0.80 | 0.80 | 0.80 | 0.80 | 0.80 | 0.80 | 0.80 | 0.80 |
| | Pure water | | 68.7 | 68.7 | 68.7 | 71.7 | 70.7 | 64.7 | 65.7 | 72.7 | 71.7 | 66.7 |
| Total | | | 100 | 100 | 100 | 100 | 100 | 100 | 100 | 100 | 100 | 100 |
| Particle diameter of pigment D50 (nm) | | | 100 | 100 | 100 | 100 | 100 | 100 | 100 | 100 | 100 | 100 |
| Pigment dispersion strength | | | B | B | B | B | B | B | B | B | B | B |
| Mass ratio (HEP or ε-CPL/pigment) | | | 0.67 | 0.67 | 0.67 | 0.17 | 0.33 | 1.33 | 1.17 | 2.00 | 1.33 | 0.50 |
| Evaluation result | Magenta chroma | | A | A | A | A | A | A | A | B | B | A |
| | Red chroma | | A | A | A | A | A | A | A | B | A | A |
| | Occurrence of gas-liquid interface foreign matter | | A | A | A | A | A | A | A | A | A | B |
| | Recoverability from plugging | | A | A | A | C | B | B | B | A | A | C |
| | Ejection stability | | A | A | A | B | B | B | A | A | A | B |
| | Redissolvability | | A | B | B | B | B | A | A | A | A | B |
| | Phase separation resistance | | A | A | A | C | C | A | A | A | A | A |

TABLE 2

| | | | Example | | | | Comparative example | | Reference example | | |
|---|---|---|---|---|---|---|---|---|---|---|---|
| | | | 11 | 12 | 13 | 14 | 1 | 2 | 1 | 2 | 3 |
| Ink composition | Pigment | P.R.150 | 7.00 | 6.00 | 6.00 | 6.00 | 6.00 | 6.00 | | | |
| | | P.V.19 | | | | | | | 6.00 | | |
| | | P.R.122 | | | | | | | | 6.00 | 6.00 |
| | Lactam compound | HEP | 4.00 | 4.00 | 4.00 | 4.00 | | | | 4.00 | |
| | | ε-CPL | | | | | | | | | |
| | | 2-Pyrrolidone | | | | | | 6.00 | | | |

TABLE 2-continued

| | | Example | | | | Comparative example | | Reference example | | |
|---|---|---|---|---|---|---|---|---|---|---|
| | | 11 | 12 | 13 | 14 | 1 | 2 | 1 | 2 | 3 |
| Organic solvent | Gly | 8.00 | 8.00 | 8.00 | 8.00 | 8.00 | 8.00 | 8.00 | 8.00 | 8.00 |
| | TEG | 5.00 | 5.00 | 5.00 | 5.00 | 5.00 | 5.00 | 5.00 | 5.00 | 5.00 |
| | TEGmBE | 3.00 | 3.00 | 3.00 | 3.00 | 3.00 | 3.00 | 3.00 | 3.00 | 3.00 |
| Surfactant | OLFIN E1010 | 2.00 | 2.00 | 2.00 | 2.00 | 2.00 | 2.00 | 2.00 | 2.00 | 2.00 |
| | Surfynol 104 | 2.00 | 2.00 | 2.00 | 5.00 | 2.00 | 2.00 | 2.00 | 2.00 | 2.00 |
| Resin | SUPERFLEX 420 | 0.50 | 0.50 | 0.50 | 0.50 | 0.50 | 0.50 | 0.50 | 0.50 | 0.50 |
| Alkali | TEA | 0.80 | 0.80 | 0.80 | 0.80 | 0.80 | 0.80 | 0.80 | 0.80 | 0.80 |
| Pure water | | 67.7 | 68.7 | 68.7 | 65.7 | 72.7 | 66.7 | 72.7 | 68.7 | 72.7 |
| Total | | 100 | 100 | 100 | 100 | 100 | 100 | 100 | 100 | 100 |
| Particle diameter of pigment D50 (nm) | | 100 | 80 | 120 | 100 | 100 | 100 | 100 | 100 | 100 |
| Pigment dispersion strength | | B | A | C | B | B | B | B | B | B |
| Mass ratio (HEP or ε-CPL/pigment) | | 0.57 | 0.67 | 0.67 | 0.67 | 0.00 | 0.00 | 0.00 | 0.67 | 0.00 |
| Evaluation result | Magenta chroma | A | B | A | A | A | A | A | A | A |
| | Red chroma | A | A | A | A | A | A | C | C | C |
| | Occurrence of gas-liquid interface foreign matter | A | A | A | A | B | B | A | A | A |
| | Recoverability from plugging | B | A | B | A | D | C | B | A | B |
| | Ejection stability | A | A | A | B | C | C | A | A | A |
| | Redissolvability | B | B | B | B | C | C | C | B | B |
| | Phase separation resistance | A | A | A | C | C | C | B | A | B |

The materials presented in Table 1 and Table 2 are as described below.

Pigment

P.R.150: FUJI FAST CARMINE 522-1 produced by Fuji Pigment Co., LTD.

P.V.19: FUJI VIOLET 19 produced by Fuji Pigment Co., LTD.

P.R.122: FUJI FAST RED 9800 produced by Fuji Pigment Co., LTD.

Lactam Compound

HEP: 1-(2-hydroxyethyl)-2-pyrrolidone

ε-CPL: ε-caprolactam

2-Pyrrolidone

Organic Solvent

Gly: glycerin

TEG: triethylene glycol

TEGmBE: triethylene glycol monobutyl ether

Surfactant

OLFIN E1010: acetylene-glycol-based surfactant produced by Nisshin Chemical Industry Co., Ltd.

Surfynol 104: acetylene-glycol-based surfactant produced by Air Products Japan, Inc.)

Resin

SUPERFLEX 420: urethane-based resin emulsion produced by Dai-ichi Kogyo Seiyaku Co., Ltd.

Alkali

TEA: triethanolamine

Pure Water

Ion-exchanged water

Each of the pigment dispersion treatment methods presented in Table 1 and Table 2 will be described below in detail.

Treatment 1: Pigment dispersion strength B

A mixture was obtained by adding pure water to 20% by mass of pigment and 7% by mass of sodium hydroxide neutralization product of a styrene-acrylic acid copolymer (acid value of 175 mgKOH/g and molecular weight of 10,000) so that the total was set to be 100% by mass and performing mixing agitation. The resulting mixture was placed in a wet sand mill filled with zirconia beads having a diameter of 0.3 mm, and dispersion treatment was performed for 6 hours. Thereafter, zirconia beads were removed by using a separator and filtration was performed by using a cellulose acetate filter having a pore diameter of 3.0 μm so that a pigment dispersion liquid was produced. In this regard, the styrene acrylic acid copolymer is a water-soluble polymer commonly used as a dispersing agent of a pigment. The volume average particle diameter $D_{50}$ of the pigment dispersion liquid obtained by the above-described operation was measured by using a particle size distribution analyzer (MT3300EXII produced by Microtrac). As a result, the volume average particle diameter $D_{50}$ was 100 nm.

Treatment 2: Pigment Dispersion Strength A

In addition, a pigment dispersion liquid was produced in the manner akin to that of Treatment 1 except that the dispersion treatment time was increased. The volume average particle diameter $D_{50}$ of the pigment dispersion liquid obtained by the above-described operation was measured by using a particle size distribution analyzer (MT3300EXII produced by Microtrac) and was 80 nm.

Treatment 3: Pigment Dispersion Strength C

A pigment dispersion liquid was produced in the manner akin to that of Treatment 1 except that the dispersion treatment time was decreased. The volume average particle diameter $D_{50}$ of the pigment dispersion liquid obtained by the above-described operation was measured by using a particle size distribution analyzer (MT3300EXII produced by Microtrac) and was 120 nm.

2. Evaluation

2.1. Magenta Chroma

A modified machine of an ink jet recording apparatus PX-S6010 produced by Seiko Epson Corporation was prepared as an ink jet recording apparatus. The above-described ink jet recording apparatus was prepared so that an ink was stored in an ink cartridge, an ink relay tank was disposed between the ink cartridge and the ink jet head, and a filter and a valve were disposed in the ink jet head.

The above-described ink jet recording apparatus was used and filled with each of the ink compositions of examples and the comparative examples, and recorded materials were obtained by recording a test pattern with an amount of ink added of 4 mg/inch$^2$ to a recording medium (A4-sized Xerox paper P, copy paper produced by Fuji Xerox Co., Ltd., basis weight of 64 g/m$^2$, and paper thickness of 88 μm). The chroma (C*) was measured at five points in the recorded material by using a spectrophotometer Xrite i1 produced by X-Rite, an average value thereof was determined, and an evaluation was performed in accordance with the following evaluation criteria. The evaluation results are presented in Table 1 and Table 2.

Evaluation Criteria

A: chroma (C*) is 60 or more

B: chroma (C*) is 55 or more and less than 60

C: chroma (C*) is less than 55

2.2. Red Chroma

The above-described ink jet recording apparatus was used, and the ratio of each of the ink compositions of examples and the comparative examples to an ink composition having the same composition as the ink composition of Example 1 except that the pigment was changed to a yellow pigment (C.I. Pigment Yellow 74) was changed from 100:0 to 0:100 in 5% steps, and recorded materials were obtained by recording a test pattern with an amount of ink added of 4 mg/inch$^2$ to a recording medium (A4-sized Xerox paper P, copy paper produced by Fuji Xerox Co., Ltd., basis weight of 64 g/m$^2$, and paper thickness of 88 μm). Of the above-described recorded materials, a recorded material having a hue angle closest to 25° was taken as an evaluation sample. The chroma (C*) was measured at five points in the evaluation sample by using a spectrophotometer Xrite it produced by X-Rite, an average value thereof was determined, and an evaluation was performed in accordance with the following evaluation criteria. The evaluation results are presented in Table 1 and Table 2.

Evaluation Criteria

A: chroma (C*) is 60 or more

B: chroma (C*) is 55 or more and less than 60

C: chroma (C*) is less than 55

2.3. Measurement of Gas-Liquid Interface Foreign Matter

Each of the ink compositions of examples and the comparative examples was filtered, 30 g of the filtered ink composition was weighed into a 50-g screw tube and left to stand at a constant temperature of 60° C. for 5 days. Thereafter, temperature was returned to normal temperature (25° C.), the ink composition was passed through a filter so as to be filtered. Subsequently, the surface of the filter was observed by using a microscope, and it was examined whether a specific foreign matter derived from the ink composition, such as keratin, other than environmental foreign matters occurred, and an evaluation was performed in accordance with the following evaluation criteria. The evaluation results are presented in Table 1 and Table 2.

A: no foreign matter occurs

B: a foreign matter occurs

2.4. Recoverability from Plugging

The ink cartridge of the above-described ink jet recording apparatus was filled with each of the ink compositions of examples and the comparative examples. After it was ascertained that all nozzles could eject the ink, the ink jet head was left to stand for 7 days in an environment at 40° C. and a humidity of 20% while the ink jet head was out of the position of the cap disposed in the printer and, therefore, the head was not capped.

After the ink jet head was left to stand, an action to suction the ink in the nozzle, that is, cleaning of the ink jet head, was repeated, the recoverability from plugging was evaluated in accordance with the following evaluation criteria based on the number of times of cleaning when all nozzles were recovered from non-ejection. The evaluation results are presented in Table 1 and Table 2.

In this regard, the above-described ink jet recording apparatus included a valve and a filter in an inlet portion through which the ink was supplied to the ink jet head. A gas-liquid interface tends to occur in the valve and the filter due to bubbles building up.

Evaluation Criteria

A: all nozzles are recovered by 2 times or less of cleaning

B: all nozzles are recovered by 3 or 4 times of cleaning

C: all nozzles are recovered by 5 or 6 times of cleaning

D: not all nozzles are recovered by 6 times of cleaning 2.5. Ejection Stability

Each of the ink compositions of examples and the comparative examples was filtered, deaerated, made into an ink pack, and set into the above-described ink jet recording apparatus. Thereafter, the printer was installed in a constant-temperature constant-humidity vessel at 30° C. and 20%.

Recording was continuously performed for 5 hours per day under the above-described recording conditions, and when recording was not performed, the ink jet head was stopped and capped. The above-described operation was performed for 30 days. After the operation for 30 days, the nozzle was examined, and the ejection stability was evaluated in accordance with the following evaluation criteria.

Evaluation Criteria

A: the number of nozzles exhibited poor ejection was 1.0% or less of total nozzles B: the number of nozzles exhibited poor ejection was more than 1.0% and 3.0% or less of total nozzles C: the number of nozzles exhibited poor ejection was more than 3.0% of total nozzles 2.6. Redissolvability Each of the ink compositions of examples and the comparative examples in 2 μl×5 droplets was dropped on a slide glass and dried at 60° C. for a day so as to obtain ink droplets. Subsequently, the slide glass to which dried ink droplets were attached was immersed in the ink composition in a glass container and left to stand for 3 minutes. After the container was turned upside down five times, the slide glass to which the dried ink droplets were attached was taken out of the container, and the redissolvability was evaluated in accordance with the following evaluation Evaluation Criteria A: all dried ink droplets are dissolved B: dried ink droplets are redissolved, although residues of dried ink droplets are observed on the slide glass.

C: dried ink droplets are not redissolved, and solids are left on the slide glass.

2.7. Phase Separation Resistance

Each of the ink compositions of examples and the comparative examples was placed in a glass screw tube and left to stand for 24 hours in an environment at 60° C. Thereafter, the glass screw tube was taken out of the environment at 60°

C., whether a surfactant was separated and floated on the liquid surface of the ink composition was visually examined, and the phase separation resistance was evaluated in accordance with the following evaluation A: separation of the surfactant is not observed B: a portion of the surfactant is separated, and an oil-float-like state is observed C: the surfactant is completely separated, and a two-layer state is observed From the evaluation results presented in Table 1 and Table 2, it was found that all of Examples 1 to 14 were excellent in redissolvability compared with Comparative example 1 in which no lactam compound was contained or Comparative example 2 in which a lactam compound other than 1-(2-hydroxyethyl)-2-pyrrolidone and ε-caprolactam was contained. Further, all of Examples 1 to 14 were excellent in recoverability from plugging, ejection stability, suppressing a gas-liquid interface foreign matter from occurring, phase separation resistance, and the like.

In this regard, in Table 1 and Table 2, all of Reference examples 1 to 3 were poor in the red chroma when a pigment other than Pigment Red 150 was used. In addition, it was found from Reference example 3 that, when a pigment other than Pigment Red 150 was used, recoverability from plugging and redissolvability did not readily deteriorate even when at least one of 1-(2-hydroxyethyl)-2-pyrrolidone and ε-caprolactam was not used.

What is claimed is:

1. A water-based ink jet ink composition comprising:

C.I. Pigment Red 150;

1-(2-hydroxyethyl)-2-pyrrolidone; and

ε-caprolactam, wherein a content of the C.I. Pigment Red 150 is from 5.5% to 10% by mass relative to a total amount of the water-based ink jet ink composition, and wherein a total content of the 1-(2-hydroxyethyl)-2-pyrrolidone and ε-caprolactam is from 0.5% to 4.5% by mass relative to a total amount of the water-based ink jet ink composition.

2. The water-based ink jet ink composition according to claim 1, wherein the total content of the 1-(2-hydroxyethyl)-2-pyrrolidone and ε-caprolactam is from 2.0% to 4.5% by mass relative to a total amount of the water-based ink jet ink composition.

3. The water-based ink jet ink composition according to claim 1, wherein the water-based ink jet ink composition is a magenta ink.

4. The water-based ink jet ink composition according to claim 1, wherein a volume average particle diameter $D_{50}$ of C.I. Pigment Red 150 is from 80 to 120 nm.

5. The water-based ink jet ink composition according to claim 1, wherein the total content of the 1-(2-hydroxyethyl)-2-pyrrolidone and ε-caprolactam is from 0.3 to 2.5 parts by mass relative to 1 part by mass of C.I. Pigment Red 150.

6. The water-based ink jet ink composition according to claim 1, further comprising a surfactant, wherein the content of the surfactant is from 0.1% to 6.0% by mass relative to a total amount of the water-based ink jet ink composition.

7. The water-based ink jet ink composition according to claim 1, wherein the water-based ink jet ink composition is used for an ink jet recording apparatus including an ink jet head for supplying the water-based ink jet ink composition to a recording medium and a supply passage, and the supply passage has a portion in which a gas-liquid interface occurs.

8. The water-based ink jet ink composition according to claim 7, wherein the portion in which a gas-liquid interface occurs is at least one selected from a group consisting of a filter, a valve, and an ink storage member.

9. An ink jet recording method comprising:

an ink attachment step of ejecting the water-based ink jet ink composition according to claim 1 from an ink jet head so as to attach to a recording medium.

* * * * *